(12) United States Patent
Noguchi et al.

(10) Patent No.: US 7,660,603 B2
(45) Date of Patent: Feb. 9, 2010

(54) CARD TYPE ELECTRONIC DEVICE SYSTEM AND CARD TYPE ELECTRONIC DEVICE

(75) Inventors: Masahiro Noguchi, Chiba (JP); Toshimasa Ike, Chiba (JP); Takayuki Matsui, Chiba (JP); Fukuzo Watanabe, Tokyo (JP)

(73) Assignees: Seiko Instruments Inc. (JP); Vodafone K.K. (JP)

( * ) Notice: Subject to any disclaimer, the term of this patent is extended or adjusted under 35 U.S.C. 154(b) by 265 days.

(21) Appl. No.: 10/585,750

(22) PCT Filed: Jan. 5, 2005

(86) PCT No.: PCT/JP2005/000012

§ 371 (c)(1),
(2), (4) Date: Oct. 13, 2006

(87) PCT Pub. No.: WO2005/069206

PCT Pub. Date: Jul. 28, 2005

(65) Prior Publication Data

US 2007/0249233 A1    Oct. 25, 2007

(30) Foreign Application Priority Data

Jan. 13, 2004    (JP) .............................. 2004-004961

(51) Int. Cl.
*H04B 1/38* (2006.01)
*G06F 13/00* (2006.01)

(52) U.S. Cl. ................. 455/557; 455/556.1; 455/575.6; 710/301

(58) Field of Classification Search ................. 455/557, 455/556.1, 575.6, 90.3, 550.1, 558, 575.1, 455/556.2, 90.2, 73, 344; 379/419, 433.09, 379/58; 235/379–380, 486–487, 492–493, 235/375; 710/16, 301, 303
See application file for complete search history.

(56) References Cited

U.S. PATENT DOCUMENTS 5,296,692 A * 3/1994 Shino .......................... 235/486

(Continued)

*Primary Examiner*—Pablo N Tran
(74) *Attorney, Agent, or Firm*—Adams & Wilks

(57) ABSTRACT

A card type electronic device system has an adapter including a self-identification function compliant with a preselected recognition procedure for identifying the adapter. A card type electronic device is provided for selective connection to one of a first card slot of a host device without the adapter and to a second card slot of the host device via the adapter that has a maximum supply current standard value greater than that of the first card slot. The card type electronic device includes a recognition function via which the adapter is recognized in accordance with the preselected recognition procedure. A control function of the card type electronic device selects predetermined operation conditions which match the maximum supply current standard value of the first card slot when the recognition function recognizes that the card type electronic device is connected to the first card slot, and selects predetermined operation conditions which match the maximum supply current standard value of the second card slot when the recognition function recognizes that the card type electronic device is connected to the second card slot.

30 Claims, 10 Drawing Sheets

U.S. PATENT DOCUMENTS

| | | | |
|---|---|---|---|
| 5,499,162 A * | 3/1996 | Bartuska et al. | 361/737 |
| 5,563,400 A * | 10/1996 | Le Roux | 235/486 |
| 5,675,524 A * | 10/1997 | Bernard | 708/109 |
| 5,714,741 A * | 2/1998 | Pieterse et al. | 235/380 |
| 5,752,857 A * | 5/1998 | Knights | 439/638 |
| 5,890,016 A * | 3/1999 | Tso | 710/64 |
| 6,073,855 A * | 6/2000 | MacKenthun | 235/492 |
| 6,118,986 A * | 9/2000 | Harris et al. | 455/575.3 |
| 6,189,055 B1 * | 2/2001 | Eisele et al. | 710/62 |
| 6,257,486 B1 * | 7/2001 | Teicher et al. | 235/380 |
| 6,332,578 B1 * | 12/2001 | Niwata et al. | 235/486 |
| 6,438,638 B1 * | 8/2002 | Jones et al. | 710/301 |
| 6,477,043 B2 * | 11/2002 | McKnight | 361/685 |
| 6,725,291 B2 * | 4/2004 | Lai et al. | 710/16 |
| 6,801,787 B1 * | 10/2004 | Page et al. | 455/556.1 |
| 7,295,443 B2 * | 11/2007 | Mambakkam et al. | 361/737 |

* cited by examiner

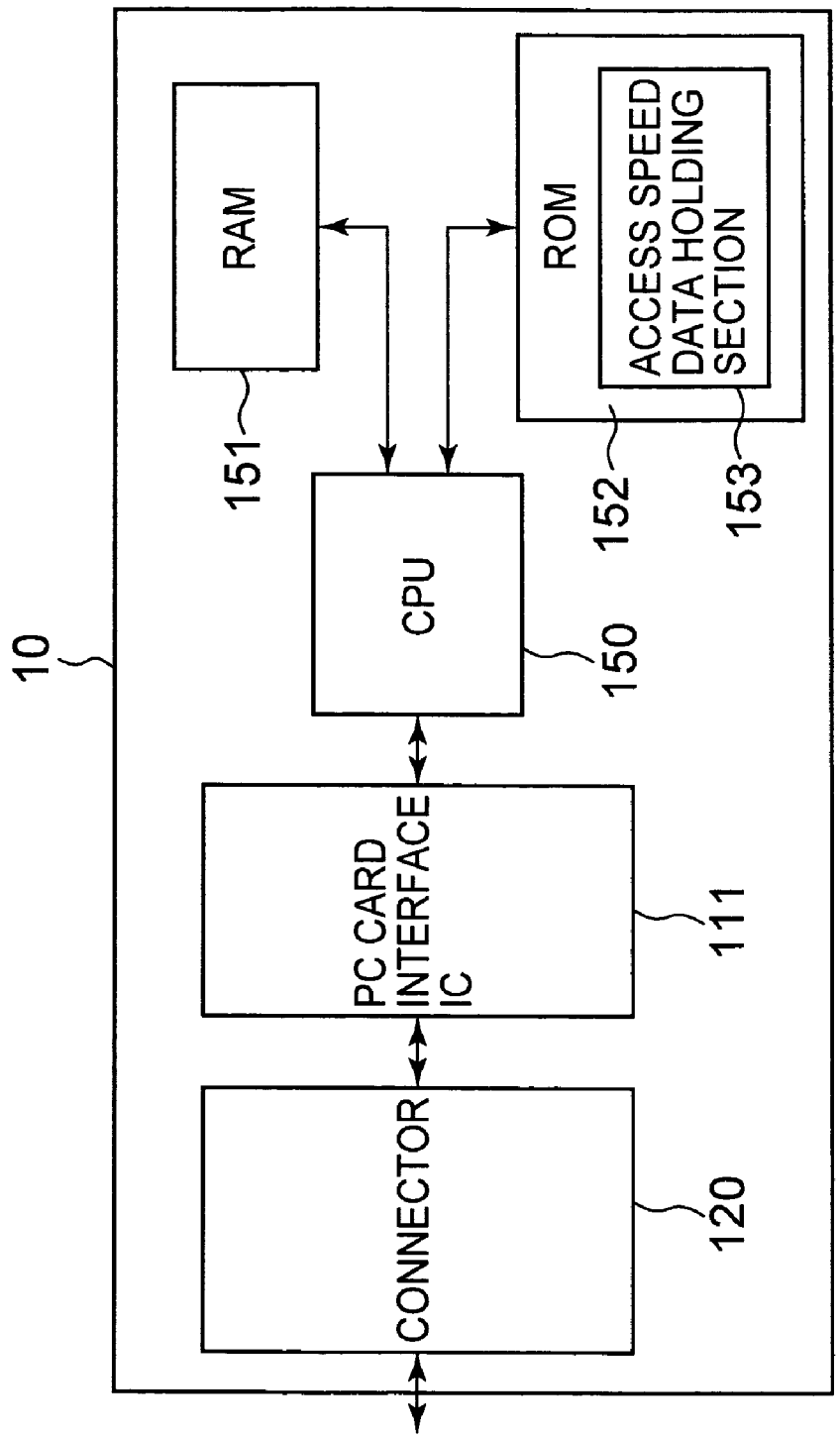

CARD TYPE ELECTRONIC DEVICE SYSTEM AND CARD TYPE ELECTRONIC DEVICE

CROSS-REFERENCE TO RELATED APPLICATION

This application is a U.S. national stage application of International Application No. PCT/JP2005/000012, filed Jan. 5, 2004, claiming a priority date of Jan. 13, 2004, and published in a non-English language.

TECHNICAL FIELD

The present invention relates to a card type electronic device system constituted of a card type electronic device and an exclusive-use or dedicated adapter.

BACKGROUND ART

Heretofore, there is a card type electronic device referred to as a PC card, and there is realized a device equipped with various types of functions for expanding a function of a portable personal computer or the like. Examples of the device include a communication card and a memory card for a modem, an LAN, a radio telephone and the like. There is also a card type electronic device referred to as a CF (Compact Flash®) card, and there is realized a device equipped with various types of functions in the same manner as in the PC card. Since this CF card has a shape which is smaller than that of the PC card, the card is used in a small-sized unit such as a portable telephone or a portable terminal in the form of a PDA or the like.

Moreover, assigning of a signal to an external terminal of the CF card conforms to a PC card standard. When an exclusive-use or dedicated adapter is used, the CF card can be attached to a PC card slot of the portable personal computer or the like, and used as the PC card (see, e.g., Patent Document 1). The exclusive-use adapter has a simple constitution in which a wiring line is simply extended to adapt the shape of the card to that of the PC card, and any control circuit is not disposed.

[Patent Document 1] Japanese Patent Application Laid-Open No. 2000-194800

Each of the above CF and PC cards operates on receiving a current supply from the card slot of a host device to which the card is to be attached. Moreover, the CF card differs from the PC card in a standard value of a maximum current supplied from the card slot in the standard, and the standard value of the maximum supply current of the CF card slot is smaller. Therefore, in consideration of a case where only the CF card is attached to the CF card slot and used, a function or a performance realized by the CF card is sometimes designed so as to be more restrictive than that realized by the PC card.

For example, in a radio telephone standard of a code division multiple access (CDMA) system, a plurality of classes are defined in transmission outputs from the terminal. However, even in a case where the PC card can cope with the class of a certain maximum transmission output, when the class of the maximum transmission output is implemented by the CF card, a maximum consumption current sometimes exceeds the maximum supply current standard value of the CF card slot. Therefore, the CF card has to be designed so that the card does not cope with the class of the maximum transmission output.

For such a reason, the above conventional combination of the CF card and the exclusive-use adapter can be used as the PC card, but the function or the performance equivalent to that of the PC card is not realized in some case. This results in a situation in which a user prepares the CF card for the portable device, and prepares the PC card in respect of the function or the performance, and a burden imposed on the user is large.

SUMMARY OF THE INVENTION

The present invention has been developed in consideration of such a situation, and an object thereof is to provide a card type electronic device system and a card type electronic device in which when a combination of a CF card and an exclusive-use or dedicated adapter is attached to a PC card slot in a host device, a function or a performance equivalent to that of the PC card is realized. On the other hand, when only the CF card is attached to a CF card slot of the host device, it is possible to realize a function or a performance in accordance with a maximum supply current standard value of the CF card slot.

To solve the above problem, according to the present invention, there is provided a card type electronic device system comprising: a card type electronic device to operate on receiving a current supply from a host device to which the card type electronic device is to be attached; and an exclusive-use adapter to adapt a shape of the device to that of a specific second card slot having a maximum supply current standard value which is larger than that of a first card slot for the card type electronic device, the card type electronic device including recognition means for recognizing the exclusive-use adapter in accordance with a predetermined recognition procedure after the operation starts; and control means for selecting predetermined operation conditions which meet the maximum supply current standard value of the first card slot, in a case where the exclusive-use adapter is not recognized, and on the other hand, for selecting predetermined operation conditions which meet the maximum supply current standard value of the second card slot in a case where the exclusive-use adapter is recognized, the exclusive-use adapter including self identification means which meets the predetermined recognition procedure.

According to this constitution, in a case where a card type electronic device such as the combination of the CF card and the exclusive-use adapter is attached to a second card slot such as the PC card slot, the exclusive-use adapter is recognized, and the operation conditions suitable for the PC card slot are selected. Therefore, the function or the performance equivalent to that of the PC card can be realized. On the other hand, in a case where only the card type electronic device (CF card) is attached to the first card slot (CF card slot), the operation conditions suitable for the CF card slot are selected without recognizing the exclusive-use adapter. Therefore, it is possible to realize the function or the performance in accordance with the maximum supply current standard value of the CF card slot.

Moreover, in the card type electronic device system of the present invention, the recognition means transmits a predetermined signal to the exclusive-use adapter, and recognizes the exclusive-use adapter in response to a response to this transmitted signal, and the identification means receives the transmitted signal to make a predetermined response.

Moreover, in the card type electronic device system of the present invention, the identification means transmits a predetermined signal to the card type electronic device, and the recognition means receives the predetermined signal from the identification means to thereby recognize the exclusive-use adapter.

Furthermore, in the card type electronic device system of the present invention, the card type electronic device has radio telephone means of a code division multiple access system, and the control means selects a transmission output class of a radio telephone standard in accordance with the recognition result of the exclusive-use adapter.

According to this constitution, since the transmission output class is selected in accordance with the recognition result of the exclusive-use adapter, it is possible to realize radio communication in accordance with the transmission output class matched with a usable consumption current.

Moreover, in the card type electronic device system of the present invention, the card type electronic device has radio telephone means of a time division multiple access system, and the control means selects the number of slots for use during a time division multiple access in accordance with the recognition result of the exclusive-use adapter.

According to this constitution, since the number of the slots for use during the time division multiple access in accordance with the recognition result of the exclusive-use adapter, it is possible to realize the radio communication in accordance with the time division multiple access matched with the usable consumption current.

Furthermore, in the card type electronic device system of the present invention, the card type electronic device is a memory card having means for switching a plurality of memory access speeds, and the control means selects the memory access speed in accordance with the recognition result of the exclusive-use adapter.

According to this constitution, since the memory access speed is selected in accordance with the recognition result of the exclusive-use adapter, it is possible to realize a memory access at the access speed matched with the usable consumption current.

Moreover, in the card type electronic device system of the present invention, the card type electronic device has: a processing circuit which operates in response to an input clock; and means for switching a plurality of input clock speeds, and the control means selects the input clock speed in accordance with the recognition result of the exclusive-use adapter.

According to this constitution, since the input clock speed is selected in accordance with the recognition result of the exclusive-use adapter, it is possible to realize execution of processing in accordance with a processing circuit performance (e.g., CPU performance) matched with the usable consumption current.

Moreover, in the card type electronic device system of the present invention, the card type electronic device is an electronic camera card having means for switching a plurality of resolutions, and the control means selects the resolution in accordance with the recognition result of the exclusive-use adapter.

According to this constitution, since the resolution is selected in accordance with the recognition result of the exclusive-use adapter, it is possible to realize photographing in accordance with the resolution matched with the usable consumption current.

In the present invention, there is provided a card type electronic device to be inserted into a first card slot of a host device to which the card type electronic device is to be attached or to be inserted into a second card slot of the host device via an exclusive-use adapter to adapt a shape of the card type electronic device to that of the second card slot having a maximum supply current standard value which is larger than that of the first card slot, the card type electronic device being configured to operate on receiving a current supply from the card slot into which the card type electronic device has been inserted, the card type electronic device comprising: recognition means for recognizing the exclusive-use adapter in accordance with a predetermined recognition procedure after the operation starts; and control means for selecting predetermined operation conditions which meet the maximum supply current standard value of the first card slot, in a case where the exclusive-use adapter is not recognized and on the other hand, for selecting predetermined operation conditions which meet the maximum supply current standard value of the second card slot, in a case where the exclusive-use adapter is recognized.

Moreover, in the card type electronic device of the present invention, the recognition means transmits a predetermined signal to the exclusive-use adapter, and recognizes the exclusive-use adapter in response to a response to this transmitted signal.

According to this constitution, in a case where a combination of the device with the exclusive-use adapter is attached to a second card slot such as the PC card slot, the card type electronic device recognizes the exclusive-use adapter, and selects the operation conditions suitable for the PC card slot. Therefore, the function or the performance equivalent to that of the PC card can be realized. On the other hand, in a case where the only card type electronic device is attached to the first card slot (CF card slot), the operation conditions suitable for the CF card slot are selected without recognizing the exclusive-use adapter. Therefore, it is possible to realize the function or the performance in accordance with the maximum supply current standard value of the CF card slot.

Moreover, the card type electronic device of the present invention has radio telephone means of a code division multiple access system, and the control means selects a transmission output class of a radio telephone standard in accordance with the recognition result of the exclusive-use adapter.

According to this constitution, since the transmission output class is selected in accordance with the recognition result of the exclusive-use adapter, it is possible to realize the radio communication in accordance with the transmission output class matched with a usable consumption power.

BRIEF DESCRIPTION OF THE DRAWINGS

FIG. 10 is a block diagram showing a constitution of a CF card 10 in another embodiment of the present invention;

DETAILED DESCRIPTION OF THE PREFERRED EMBODIMENTS

One embodiment of the present invention will be described hereinafter with reference to the drawings. In the present embodiment, as a typical example of a card type electronic device, there will be described a CF card which realizes a radio telephone function of a CDMA system. As a typical example of an exclusive-use adapter, there will be described an exclusive-use adapter which adapts a shape of the CF card to that of a PC card slot. As a typical example of a host device to which a card type electronic device system is to be attached, a portable personal computer will be described.

Figure 1:
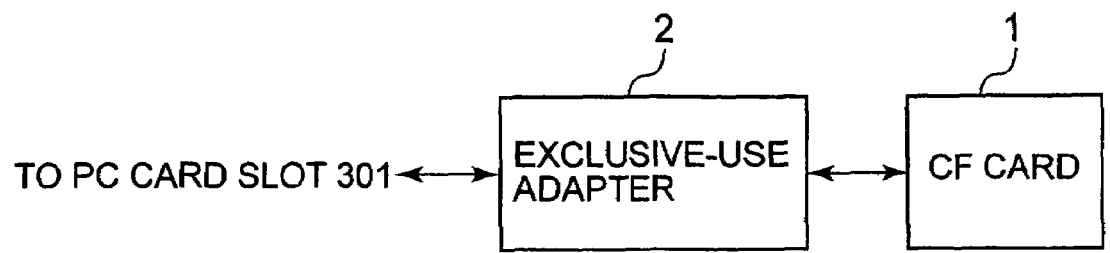
FIG. 1 is a block diagram showing a constitution of a card type electronic device system in one embodiment of the present invention.
Figure 2:
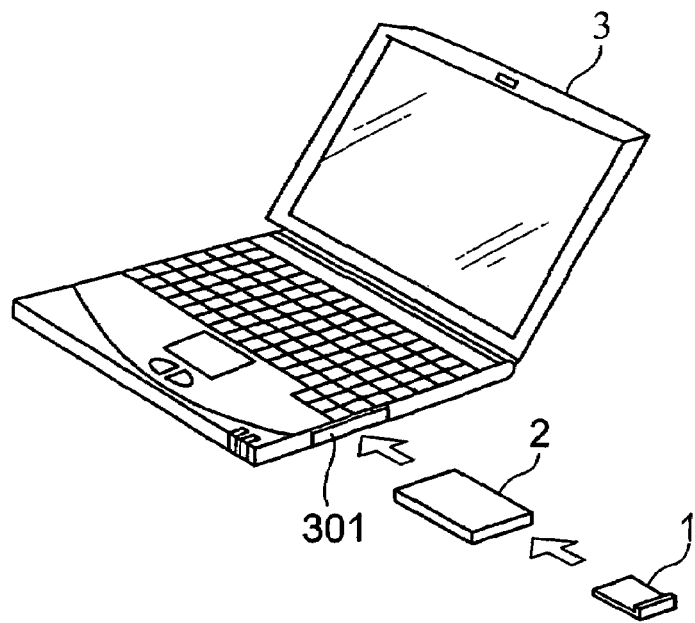
FIG. 2 is an appearance diagram of the card type electronic device system of the embodiment, and a portable personal computer (host device) 3 to which the system is to be attached.

FIG. 1 is a block diagram showing a constitution of a card type electronic device system in one embodiment of the present invention. FIG. 2 is an appearance diagram of the card type electronic device system of the embodiment, and a portable personal computer (host device) 3 to which the system is to be attached. In FIGS. 1 and 2, the card type electronic device system is constituted of a CF card 1 and an exclusive-use or dedicated adapter 2. Moreover, as shown in FIG. 2, the CF card 1 can be set to the exclusive-use adapter 2, and attached to a PC card slot 301 of the portable personal computer 3.

Figure 3:
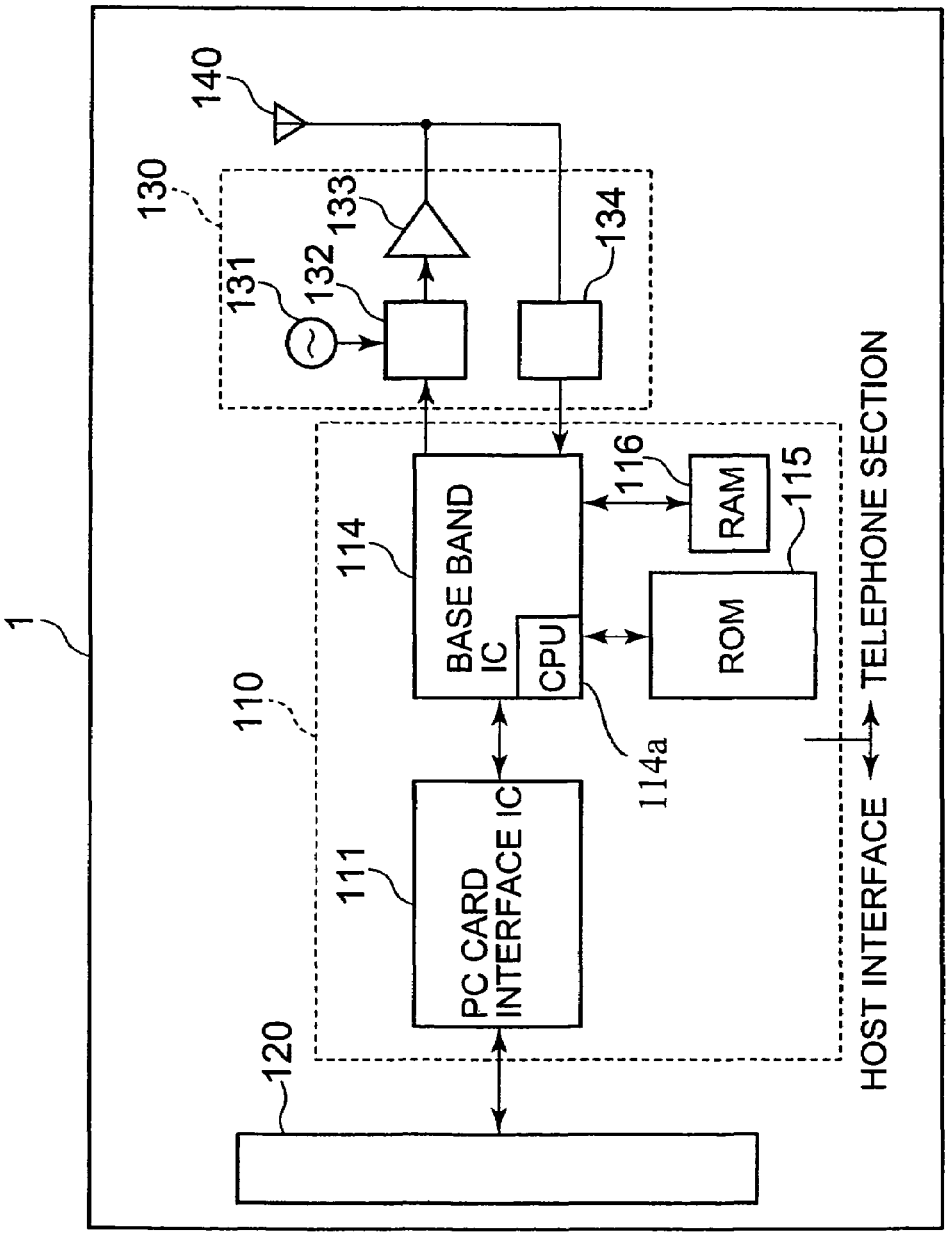
FIG. 3 is a block diagram showing a constitution of a CF card 1 shown in FIG. 1.

FIG. 3 is a block diagram showing a constitution of the CF card 1 in the present embodiment. This CF card 1 can realize the radio telephone function of the CDMA system, and perform voice communication and data communication by radio.

In FIG. 3, the CF card 1 includes: a circuit unit 110 disposed in a card-like case (not shown); a connector 120 disposed on an outer side face of the case; and a radio section 130 having an antenna 140, the radio section 130 being configured to transmit and receive a radio signal with respect to a base station of a public network. The connector 120 is connectable to a CF card slot. Therefore, the CF card 1 can be attached, as it is, to a host device having the CF card slot.

The circuit unit 110 is connected to the connector 120, and inputs and outputs a signal with respect to the host device via this connector 120. The circuit unit 110 is also connected to the radio section 130, and inputs and outputs a signal to be transmitted and received with respect to the base station by this radio section 130.

The circuit unit 110 is constituted of: a host interface including a PC card interface IC 111; and a telephone section including a base band IC 114, an ROM 115 and an RAM 116.

The base band IC 114 contains a CPU 114a, and executes a control program stored in the ROM 115 to thereby control each section.

The base band IC 114 performs modulation and demodulation for transmitting and receiving data such as voice between the radio section 130 and the base station.

The CPU 114a controls the PC card interface IC 111 to perform data communication with respect to the host device. Moreover, on receiving an instruction from the host device via the PC. card interface IC 111, control is executed so that the base band IC 114 performs a transmitting and receiving operation, and the operation of the radio section 130 is also controlled. The CPU 114a performs processing to recognize the exclusive-use adapter 2 in accordance with a predetermined recognition procedure. The procedure to recognize the exclusive-use adapter 2 will be described later.

Moreover, in the ROM 115, each corresponding transmission power parameter is stored beforehand every transmission output class of the CDMA system. This transmission power parameter realizes transmission output characteristics of the corresponding transmission output class. The CPU 114a controls the transmission output of the radio section 130 by use of any of the transmission power parameters.

The radio section 130 transmits and receives a radio signal by the CDMA system.

Figure 4:
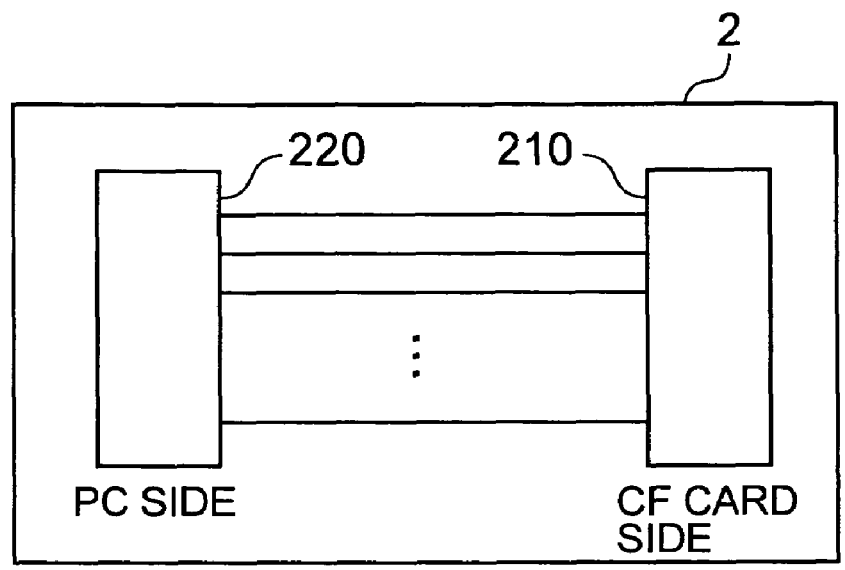
FIG. 4 is a block diagram showing a constitution of an exclusive-use adapter 2 shown in FIG. 1.

FIG. 4 is a block diagram showing a constitution of the exclusive-use adapter 2 in the present embodiment. This exclusive-use adapter 2 has an outer shape attachable to the PC card slot 301. The exclusive-use adapter 2 has an inner shape to which the CF card 1 is attachable. Moreover, as shown in FIG. 4, in the exclusive-use adapter 2, a connector 210 is disposed in a position on a CF card side, and a connector 220 is disposed in a position on a PC card slot side.

The connector 210 on the CF card side is connectable to the connector 120 of the CF card 1 shown in FIG. 3 described above, that is, the connector is used for the CF card slot. Moreover, when the CF card 1 is attached to the exclusive-use adapter 2, the connector 210 is connected to the connector 120.

The connector 220 on the PC card slot side is connectable to a connector (not shown) of the PC card slot 301, that is, the connector is used for the PC card. Moreover, when the exclusive-use adapter 2 is attached to the PC card slot 301, the connector of the PC card slot 301 is connected to the connector 220.

Moreover, as shown in FIG. 4, between the connectors 210 and 220, a wiring line is disposed between corresponding terminals. This forms an especially simple constitution in which any control circuit is not disposed.

As described. above, in the exclusive-use adapter 2, basically, the wiring line is simply extended to adapt a card shape of the CF card 1 to that of the PC card. Furthermore, self identification means is disposed.

Figure 5:
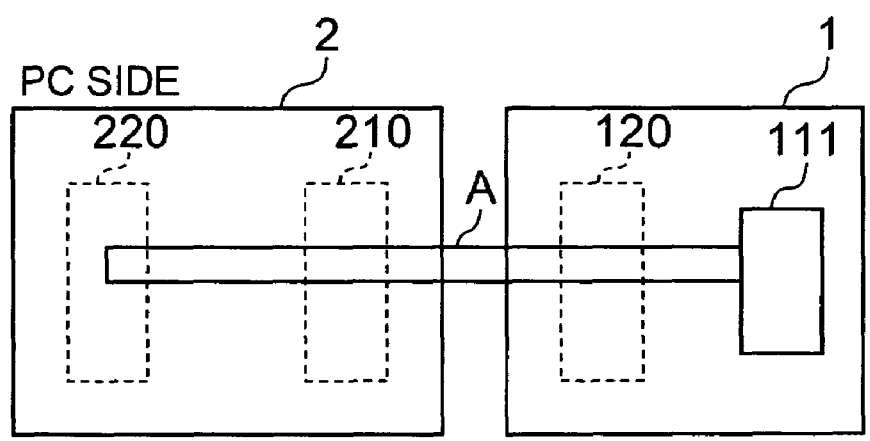
FIG. 5 is an explanatory view showing a recognition procedure of the exclusive-use adapter 2 shown in FIG. 4.

FIG. 5 is an explanatory view showing a procedure to recognize the exclusive-use adapter 2 in the present embodiment.

As shown in FIG. 5, the connector 220 of the exclusive-use adapter 2 is provided with the wiring line so that one signal line is turned back to another signal line. Two signal lines to be turned back are unused between the host devices.

The CPU 114a of the CF card 1 outputs a predetermined signal A to the signal line (forward route) to be turned back in order to recognize the exclusive-use adapter 2 via the PC card interface IC 111. Accordingly, when the exclusive-use adapter 2 is connected, the signal A returns from the signal line (backward route) to be turned back. Therefore, the exclusive-use adapter 2 can be recognized. On the other hand, unless the exclusive-use adapter 2 is connected, the signal A does not return from the signal line (backward route) to be turned back, and therefore the exclusive-use adapter 2 cannot be recognized.

Examples of the signal A include a signal string which alternately repeats a high level and a low level a plurality of times.

Next, there will be described an operation relating to consumption current control of the card type electronic device system in the present embodiment with reference to FIG. 6.

Figure 6:
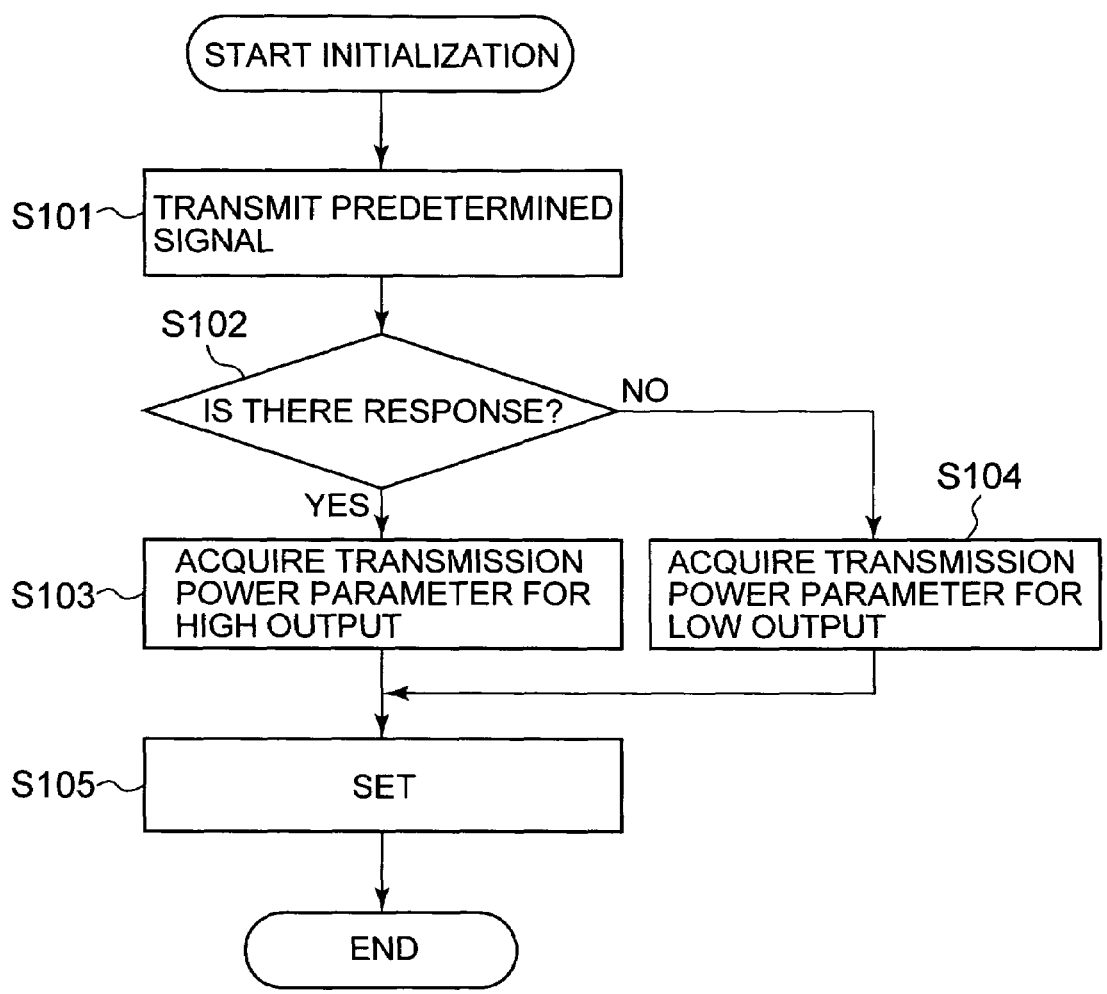
FIG. 6 is a flow chart showing a flow of consumption current control processing to be performed by the CF card 1 shown in FIG. 3.

FIG. 6 is a flow chart showing a flow of the consumption current control processing to be performed by the CF card 1.

After the CF card 1 is attached to the card slot of the host device, and a current supply is received from the card slot, the CF card starts its operation. Moreover, when initialization is started, the processing of FIG. 6 starts during the initialization.

In FIG. 6, first the CPU 114*a* of the CF card 1 transmits the predetermined signal A via the connector 120 as described above with reference to FIG. 5 (step S101). Subsequently, it is judged whether or not there is a response to the transmitted signal (step S102).

As the signal A, there is transmitted, for example, the signal string which alternately repeats the high level and the low level for only a predetermined number of times. Moreover, in a case where this signal string returns, it is judged that there is a response. In this case, it can be recognized that the CF card 1 is set to the exclusive-use adapter 2 and attached to the PC card slot of the host device.

On the other hand, unless the signal string returns, it is judged that there is not any response. In this case, it can be recognized that the only CF card 1 is attached, as it is, to the CF card slot of the host device.

Subsequently, as a result of the judgment of the step S102, in a case where there is the response, the CPU 114*a* of the CF card 1 acquires, from the ROM 115, the transmission power parameter for a high output (step S103). On the other hand, in a case where there is not any response, the CPU acquires, from the ROM 115, the transmission power parameter for a low output (step S104). Subsequently, the acquired transmission power parameter is set for transmission output control of the radio section 130 (step S105).

Accordingly, the CPU 114*a* controls the transmission output of the radio section 130 by use of the transmission power parameter set for the transmission output control. As a result, a radio signal is transmitted from the radio section 130 in accordance with the transmission output of a transmission output class corresponding to the transmission power parameter set for the transmission output control.

Figure 7:
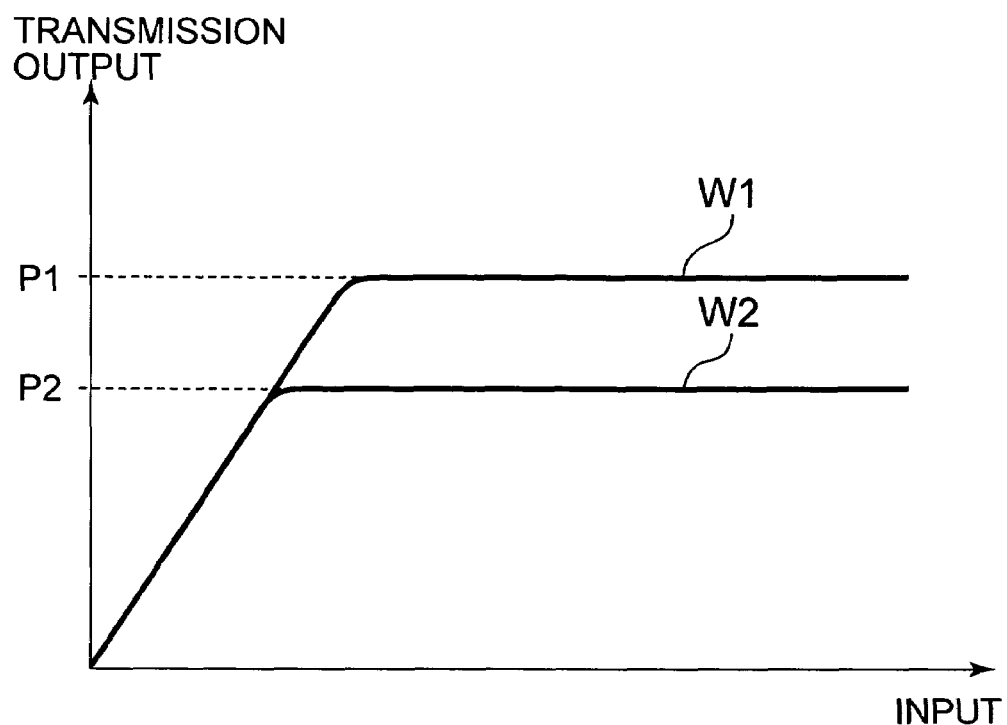
FIG. 7 is a waveform diagram showing transmission output characteristics of a transmission output class of a CDMA system.

FIG. 7 shows a waveform diagram showing an output level of the transmission output class of the CDMA system. As to waveforms shown in FIG. 7, there are shown a waveform W1 indicating a high transmission output level, and a waveform W2 indicating a low transmission output level. A maximum transmission output value P2 of the low transmission output class is smaller than a maximum transmission output value P1 of the high transmission output class. Moreover, in a case where the low transmission output class is selected, a consumption current of the CF card 1 is suppressed to be not more than a maximum supply current standard value of the CF card slot. In a case where the high transmission output class is selected, the consumption current of the CF card 1 is suppressed to be not more than the maximum supply current standard value of the PC card slot.

Therefore, according to the present embodiment, in a case where a combination of the CF card 1 and the exclusive-use adapter 2 is attached to the PC card slot, the exclusive-use adapter 2 is recognized, and the high transmission output class is selected. Therefore, radio transmission can be performed in accordance with high output characteristics which are equivalent to those of the PC card.

On the other hand, in a case where only the CF card 1 is attached to the CF card slot, the low transmission output class is selected without recognizing the exclusive-use adapter 2. Therefore, the radio transmission can be performed in accordance with low output characteristics adapted to the maximum supply current standard value of the CF card slot.

In consequence, the user does not have to have both of the CF card and the PC card or selectively use them. When the user has the only CF card 1 of the present embodiment, it is possible to constantly perform appropriate radio communication of the CDMA system.

The embodiment of the present invention has been described above in detail with reference to the drawings, but a specific constitution is not limited to this embodiment, and design changes and the like are also included without departing from the scope of the present invention.

Figure 8:
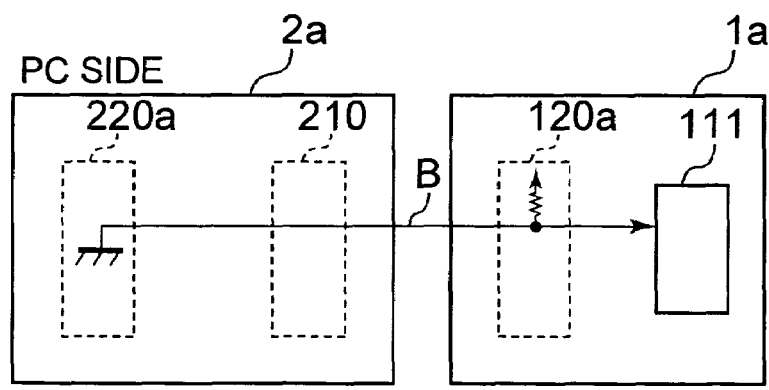
FIG. 8 is an explanatory view showing a recognition procedure of an exclusive-use adapter in another embodiment.

For example, as the procedure to recognize the exclusive-use adapter of the present invention, the predetermined signal may be transmitted from the exclusive-use adapter. On receiving this predetermined signal, the CF card may recognize the exclusive-use adapter. As shown in, for example, FIG. 8, one signal line that is not used between the host devices is connected to a ground line by a connector 220*a* of an exclusive-use adapter 2*a*. Between the host devices, the same unused signal line is pulled up by a connector 120*a* of a CF card 1*a*.

Accordingly, in a case where only the CF the card 1*a* is attached to the CF card slot, the signal line indicates a high level. In a case where the combination of the CF card 1*a* and the exclusive-use adapter 2*a* is attached to the PC card slot, however, a low level signal B is input from the exclusive-use adapter 2*a* via the signal line, and the exclusive-use adapter 2*a* can be recognized.

Moreover, in the above embodiment, as the example of the card type electronic device of the present invention, the CF card has been described which realizes the radio telephone function of the CDMA system, but the present invention is applicable to any type of card.

In, for example, a communication card which realizes the radio telephone function of the time division multiple access (TDMA) system, the number of the slots for use during the time division multiple access may be selected in accordance with the recognition result of the exclusive-use adapter.

Figure 9A:
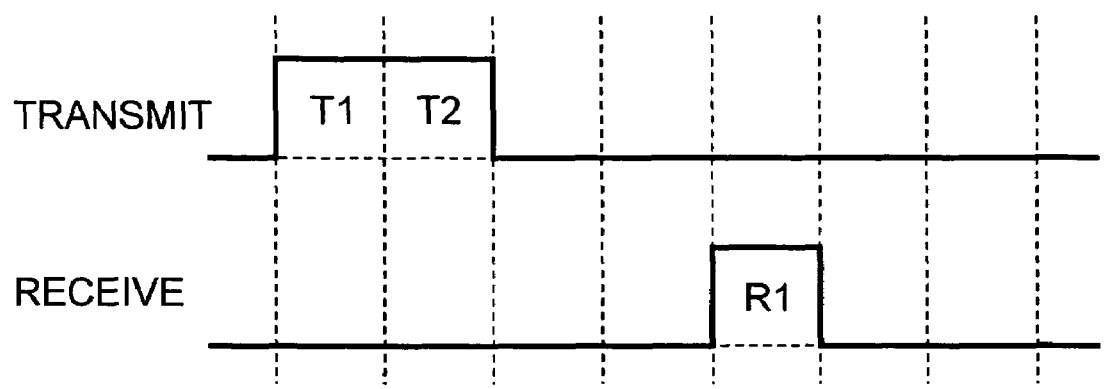
FIG. 9 is an explanatory view showing one example of a slot for use in a communication card which realizes a radio telephone function of a time division multiple access system in the present invention.
Figure 9B:
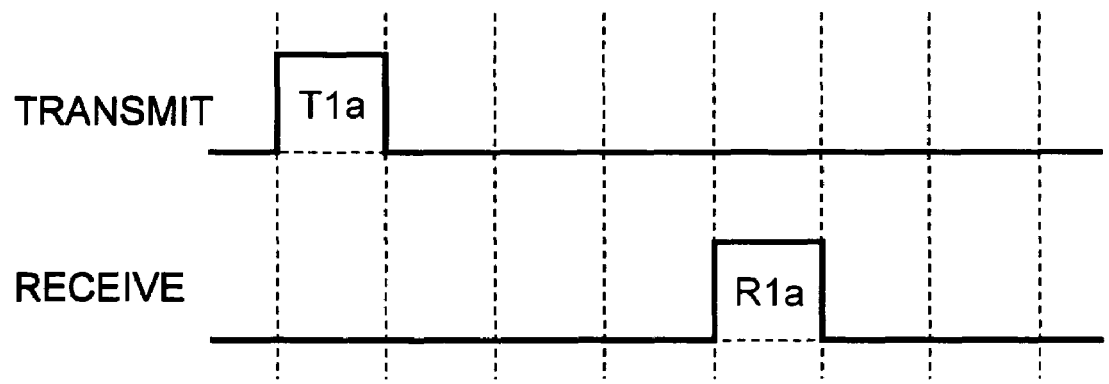

FIG. 9 is an explanatory view showing one example of the slot for use during the time division multiple access. In this example, each of transmission and reception is constituted of four slots. Moreover, in a case where it is recognized that the exclusive-use adapter 2 is connected, as shown in FIG. 9A, the transmission is performed by use of two slots T1 and T2, and the reception is performed by use of a slot R1. On the other hand, in a case where it is recognized that the exclusive-use adapter 2 is not connected, as shown in FIG. 9B, the transmission is performed by use of one slot T1*a*, and the reception is performed by use of a slot R1*a*.

It is to be noted that in the above example of FIG. 9, the number of the slots for use in the transmission is switched to two or one, but the number of the slots for use may be determined in accordance with a maximum consumption current standard value during each of connection and non-connection of the exclusive-use adapter 2.

In the time division multiple access system, the transmission is turned on or off every slot, and the consumption current also fluctuates every time the transmission is turned on or off. However, an average consumption current increases or decreases in accordance with the number of the slots for use. Therefore, the present invention is applicable. In consequence, it is possible to realize the radio communication by the time division multiple access matched with the usable consumption current.

Moreover, in a memory card in which a plurality of memory access speeds can be switched, the memory access speed may be selected in accordance with the recognition result of the exclusive-use adapter. In consequence, it is possible to realize the memory access at an access speed matched with the usable consumption current.

In recent years, with miniaturization of a semiconductor process, a capacity of a memory device enlarges, reduction of power consumption is realized, and there exist various memory cards ranging from a card in which a flash device is used to a card in which a hard disk is used. The access speed of the memory device also remarkably enhances.

Even with such proceeding of power saving, accompanying the enhancement of the access speed, wait processing is performed during a low-speed access. Therefore, an average power consumption seems to drop. As the access speed is raised, however, the power consumption increases.

Furthermore, in the memory card in which a plurality of large-capacity memory devices are used, or in a case where the memory card is used on which a hard disk is mounted, as the speed of the access to the memory card is raised, the current consumed by the memory card from the slot increases, and finally the consumption might exceed a slot supply power standard.

To solve the problem, each data of a memory accessible speed is held beforehand with respect to the power (CF card slot=500 mA, PC card slot=1000 mA) which is usable in each card. Accordingly, in a case where any card adapter is not attached, the card is judged to be operable up to the memory access speed at which the consumption current of the CF card slot can be utilized to the maximum. In a case where it is judged that the card adapter is attached, the card operates up to the memory access speed at which the consumption current of the PC card slot can be utilized to the maximum. Therefore, it is possible to provide a memory card which can realize the maximum access speed in various modes.

FIG. 10 is a block diagram showing one embodiment of the above memory card of the present invention. In FIG. 10, a CF card 10 has a connector 120 disposed on an outer side face of a case. The connector 120 is connectable to a CF card slot. Therefore, the CF card 10 can be attached as it is to a host device having the CF card slot.

The connector 120 is connected to a CPU 150 via a PC card interface IC 111 to input and output a signal. The CPU 150 controls an RAM 151 in response to a signal from the PC card interface IC 111 to perform data communication with respect to the host device. The CF card 10 is connected to a PC card slot of a portable personal computer (host device) by an exclusive-use adapter in the same manner as in the above embodiment.

In an access speed data holding section 153 of an ROM 152, a memory access speed of a PC card and that of the CF card are held, and a speed at which the CPU 150 accesses the RAM 151 is controlled.

After the CF card 10 is attached to the card slot of the host device, the card starts its operation on receiving a current supply from the card slot. Moreover, when initialization is started, processing of FIG. 11 is started during the initialization.

Figure 11:
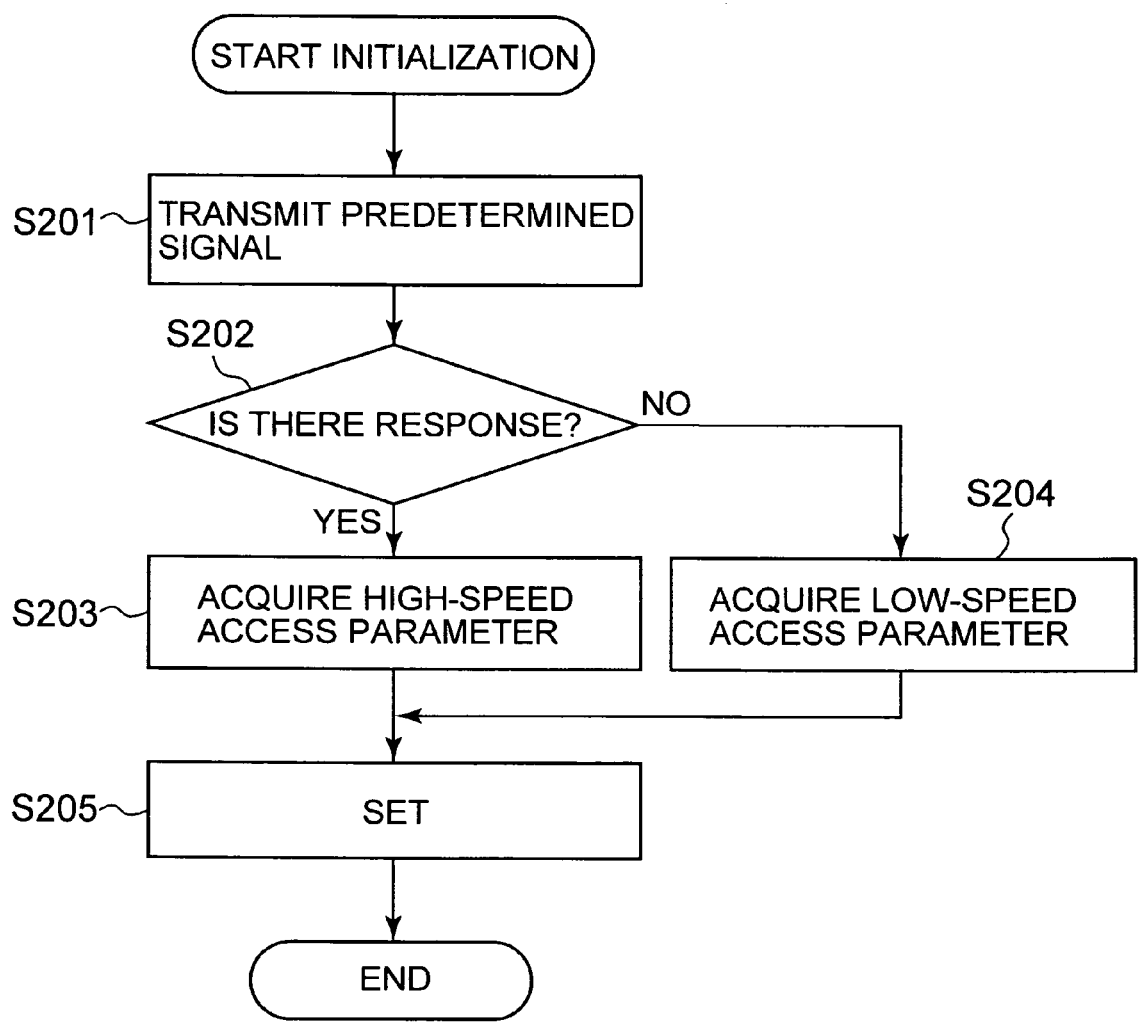
FIG. 11 is a flow chart showing a flow of access speed control processing to be performed by the CF card 10 shown in FIG. 10.

In FIG. 11, first the CPU 150 of the CF card 10 transmits a predetermined signal via the connector 120 (step S201). Subsequently, it is judged whether or not there is a response signal to the transmitted signal (step S202).

In a case where the response signal returns, it is judged that there is the response. In this case, it can be recognized that the CF card 10 is set to the exclusive-use adapter and attached to the PC card slot of the host device.

On the other hand, when any response signal does not return, it is judged that there is not any response. In this case, it can be recognized that only the CF card 10 is attached as it is to the CF card slot of the host device.

Subsequently, as a result of the judgment of the step S202, in a case where there is a response, the CPU 150 of the CF card 10 acquires a parameter for a high access speed from the access speed data holding section 153 of the ROM 152 (step S203). On the other hand, in a case where there is not any response, the CPU acquires a parameter for a low access speed from the access speed data holding section 153 of the ROM 152 (step S204). Subsequently, the acquired access speed parameter is set as the access speed of the RAM 151 (step S205). The CPU 150 inputs and outputs data with respect to the RAM 151 at the set access speed, and exchanges the data with the host device. In consequence, it is possible to provide a memory-accessible memory card which is comfortable and safe for the user.

Moreover, in a case where the card includes a processing circuit (CPU) which operates in response to an input clock, and it is possible to switch a plurality of input clock speeds, the input clock speed may be selected in accordance with the recognition result of the exclusive-use adapter. In consequence, it is possible to realize execution of processing by a CPU performance matched with a usable consumption current.

Furthermore, in an electronic camera card capable of switching a plurality of resolutions, the resolution may be selected in accordance with the recognition result of the exclusive-use adapter. In consequence, it is possible to realize photographing in accordance with a resolution matched with the usable consumption current.

In, for example, a card type web camera for a PC, an amount of data to be processed by an integration circuit increases in accordance with the resolution of the camera. Especially, in real-time video, a display image quality differs with the amount of the data which can be processed in a predetermined time.

In a case where a processing speed of the integration circuit is sufficient, when a larger amount of the data is processed in a defined time, that is, the processing speed enhances, the consumption current is increased.

To solve the problem, data of the data processing speed of the integration circuit is held beforehand with respect to the power (CF card slot=500 mA, PC card slot=1000 mA) which is usable in each card. Accordingly, in a case where any card adapter is not attached, the card is judged to be operable up to the processing speed at which the consumption current of the CF card slot can be utilized to the maximum. In a case where it is judged that the card adapter is attached, the card operates up to the processing speed at which the consumption current of the PC card slot can be utilized to the maximum. Therefore, it is possible to provide a card type electronic camera for the PC, which can realize the maximum image quality of the camera.

Figure 12:
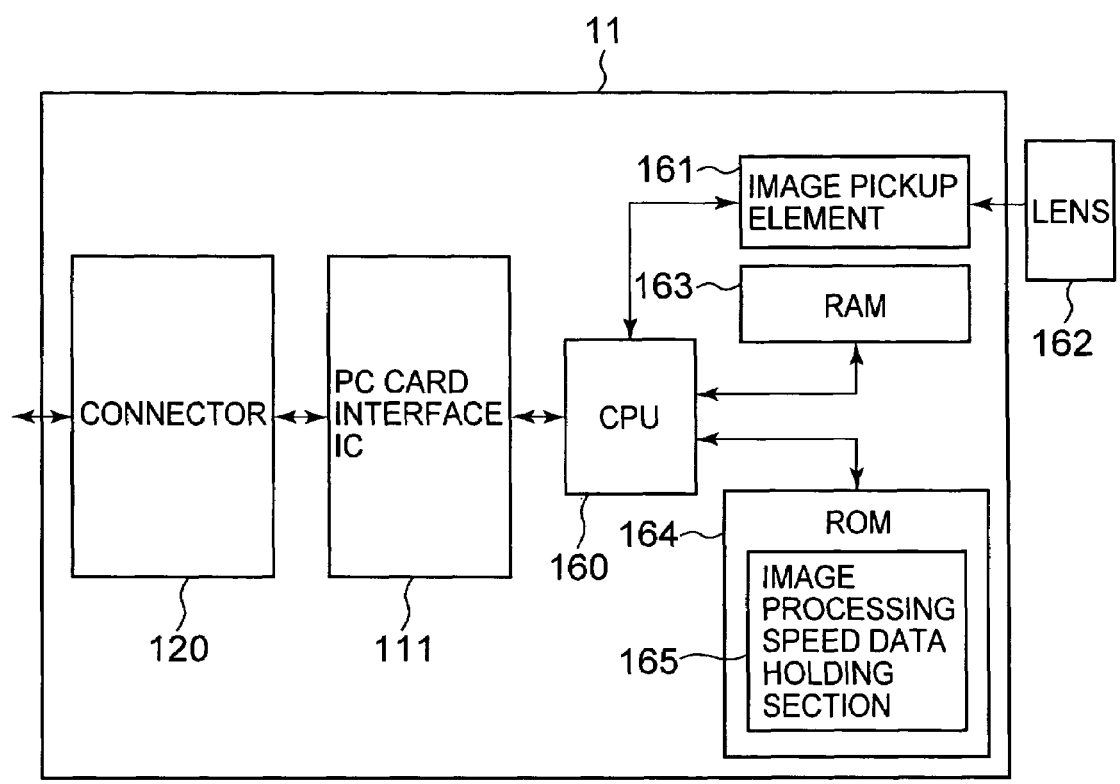
FIG. 12 is a block diagram showing a constitution of a CF card 11 in another embodiment of the present invention.

FIG. 12 is a block diagram showing one embodiment of the above card type electronic camera for the PC in the present invention. In FIG. 12, a CF card 11 has a connector 120 disposed on an outer side face of a case. The connector 120 is connectable to a CF card slot. Therefore, the CF card 11 can be attached as it is to a host device having the CF card slot.

The connector 120 is connected to a CPU 160 via a PC card interface IC 111 to input and output a signal. An image pickup element 161 converts, into electronic data, an image from a lens 162 disposed outwardly from the CF card 11. In response to a signal from the PC card interface IC 111, the CPU 160, controls the image pickup element 161, an RAM 163 and an ROM 164 to transmit image data to the host device. The CF card 11 is connected to a PC card slot of a portable personal computer (host device) by an exclusive-use adapter in the same manner as in the above embodiment.

In an image processing speed data holding section 165 of the ROM 164, an image processing speed of a PC card and that of the CF card are held, and there are controlled speeds of image processing performed in the CPU 160, the image pickup element 161, the RAM 163 and the ROM 164.

After the CF card 11 is attached to the card slot of the host device, the card starts its operation on receiving a current supply from the card slot. Moreover, when initialization is started, processing of FIG. 13 is started during the initialization.

Figure 13:
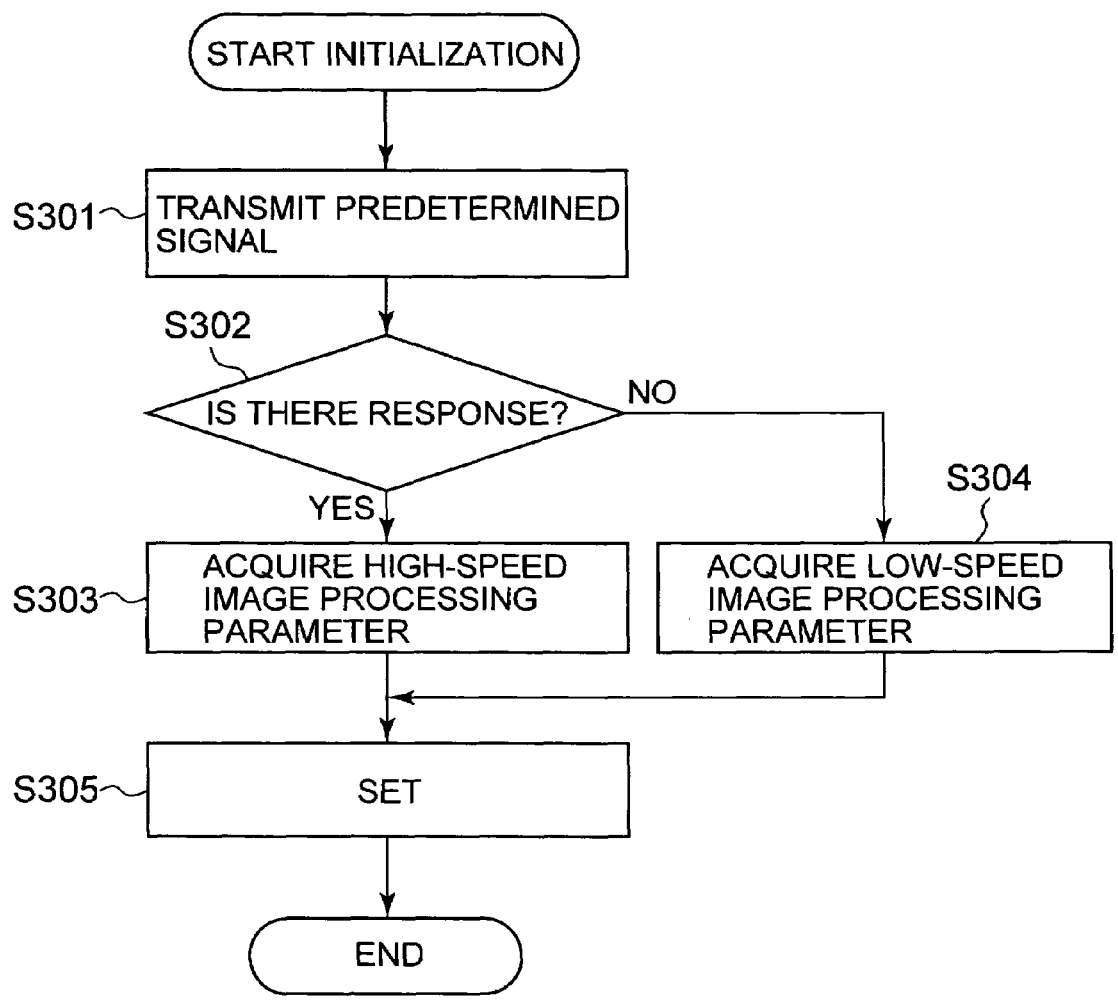
FIG. 13 is a flow chart showing a flow of image processing speed control processing to be performed by the CF card 11 shown in FIG. 12.

In FIG. 13, first the CPU 160 of the CF card 11 transmits a predetermined signal via the connector 120 (step S301). Subsequently, it is judged whether or not there is a response signal to the transmitted signal (step S302).

In a case where the response signal returns, it is judged that there is the response. In this case, it can be recognized that the CF card 11 is set to the exclusive-use adapter and attached to the PC card slot of the host device.

On the other hand, when any response signal does not return, it is judged that there is not any response. In this case, it can be recognized that only the CF card 11 is attached as it is to the CF card slot of the host device.

Subsequently, as a result of the judgment of the step S302, in a case where there is a response, the CPU 160 of the CF card 11 acquires a parameter for high-speed image processing from the image processing speed data holding section 165 of the ROM 164 (step S303). On the other hand, in a case where there is not any response, the CPU acquires a parameter for low-speed image processing from the image processing speed data holding section 165 of the ROM 164 (step S304). Subsequently, the acquired image processing speed parameter is set (step S305). The CPU 160 processes an photographed image at the set image processing speed.

In consequence, with respect to a user, it is possible to provide the card type camera for the PC, which is usable with a comfortable image quality.

Moreover, in the above embodiment, as the example of the exclusive-use adapter of the present invention, there has been described the adapter which adapts the shape of the CF card to that of the PC card slot, but there is not any restriction on a type of the card to be adapted or a type of the card slot to which the card is adapted.

Furthermore, as an example of the host device to which the card type electronic device system of the present invention is to be attached, the portable personal computer has been described, but the host device is not limited to this.

INDUSTRIAL APPLICABILITY

According to the present invention, in a case where a card type electronic device, for example, a combination of a CF card and an exclusive-use adapter is attached to a second card slot, for example, a PC card slot, it is possible to realize a function or a performance which is equivalent to that of a PC card. On the other hand, in a case where only the card type electronic device (CF card) is attached to a first card slot (CF card slot), it is possible to realize a function or a performance in accordance with a maximum supply current standard value of the CF card slot. In consequence, a user does not have to have both of the CF card and the PC card or selectively use them. When the user has the only CF card of the present invention, it is possible to constantly use the CF card on appropriate operation conditions.

The invention claimed is:

1. A card type electronic device system comprising:
an adapter including self-identification means compliant with a preselected recognition procedure for identifying the adapter; and
a card type electronic device having a connector configured to selectively connect the card type electronic device to a host device via both a first configuration in which the card type electronic device is connected directly to a first card slot of the host device without the adapter and a second configuration in which the card type electronic device is connected to a second card slot of the host device via the adapter, the card type electronic device starting an operation upon receipt of a current supply from the first card slot or the second card slot to which it is connected, the second card slot having a maximum supply current standard value greater than that of the first card slot, the card type electronic device comprising: (a) recognition means for recognizing the adapter, upon the start of an operation of the card type electronic device, in accordance with the preselected recognition procedure that determines whether the card type electronic device is connected to the first card slot or to the second card slot of the host device; and (b) control means for selecting predetermined operation conditions which match the maximum supply current standard value of the first card slot when the recognition means recognizes that the card type electronic device is connected to the first card slot, and for selecting predetermined operation conditions which match the maximum supply current standard value of the second card slot when the recognition means recognizes that the card type electronic device is connected to the second card slot.

2. A card type electronic device system according to claim 1; wherein the recognition means transmits a predetermined signal to the identification means of the adapter and the identification means outputs a corresponding predetermined response to the transmitted predetermined signal; and wherein the recognition means recognizes the adapter in accordance with the predetermined response to the transmitted predetermined signal.

3. A card type electronic device system according to claim 2; wherein the card type electronic device further comprises means for transmitting and receiving radio telephone signals by means of a code division multiple access (CDMA) system; and wherein the selected predetermined operation conditions correspond to a transmission output class of a radio telephone standard of the CDMA system selected by the control means in accordance with a recognition result by the recognition means.

4. A card type electronic device system according to claim 2; wherein the card type electronic device further comprises means for transmitting and receiving radio telephone signals by means of a time division multiple access (TDMA) system; and wherein the selected predetermined operation conditions correspond to a number of slots for use during a TDMA selected by the control means in accordance with a recognition result by the recognition means.

5. A card type electronic device system according to claim 2; wherein the card type electronic device is a memory card including means for switching a plurality of memory access speeds; and wherein the selected predetermined operation conditions correspond to one of the memory access speed selected by the control means in accordance with a recognition result by the recognition means.

6. A card type electronic device system according to claim 2; wherein the card type electronic device further comprises a processing circuit that operates in response to an input clock, and means for switching a plurality of input clock speeds; and wherein the selected predetermined operation conditions correspond to one of the input clock speeds selected by the control means in accordance with a recognition result by the recognition means.

7. A card type electronic device system according to claim 2; wherein card type electronic device is an electronic camera card including means for switching a plurality of image resolutions; and wherein the selected predetermined operation conditions correspond to one of the image resolutions selected by the control means in accordance with a recognition result by the recognition means.

8. A card type electronic device system according to claim 1; wherein the identification means transmits a predetermined signal to the card type electronic device, and the recognition means receives the predetermined signal from the identification means to thereby recognize the adapter.

9. A card type electronic device system according to claim 8; wherein the card type electronic device further comprises means for transmitting and receiving radio telephone signals by means of a code division multiple access (CDMA) system; and wherein the selected predetermined operation conditions correspond to a transmission output class of a radio telephone standard of the CDMA system selected by the control means in accordance with a recognition result by the recognition means.

10. A card type electronic device system according to claim 8; wherein the card type electronic device further comprises means for transmitting and receiving radio telephone signals by means of a time division multiple access (TDMA) system; and wherein the selected predetermined operation conditions correspond to a number of slots for use during a TDMA selected by the control means in accordance with a recognition result by the recognition means.

11. A card type electronic device system according to claim 8; wherein the card type electronic device is a memory card including means for switching a plurality of memory access speeds; and wherein the selected predetermined operation conditions correspond to one of the memory access speed selected by the control means in accordance with a recognition result by the recognition means.

12. A card type electronic device system according to claim 8; wherein the card type electronic device further comprises a processing circuit that operates in response to an input clock, and means for switching a plurality of input clock speeds; and wherein the selected predetermined operation conditions correspond to one of the input clock speeds selected by the control means in accordance with a recognition result by the recognition means.

13. A card type electronic device system according to claim 8; wherein card type electronic device is an electronic camera card including means for switching a plurality of image resolutions; and wherein the selected predetermined operation conditions correspond to one of the image resolutions selected by the control means in accordance with a recognition result by the recognition means.

14. A card type electronic device system according to claim 1; wherein the card type electronic device further comprises means for transmitting and receiving radio telephone signals by means of a code division multiple access (CDMA) system; and wherein the selected predetermined operation conditions correspond to a transmission output class of a radio telephone standard of the CDMA system selected by the control means in accordance with a recognition result by the recognition means.

15. A card type electronic device system according to claim 1; wherein the card type electronic device further comprises means for transmitting and receiving radio telephone signals by means of a time division multiple access (TDMA) system; and wherein the selected predetermined operation conditions correspond to a number of slots for use during a TDMA selected by the control means in accordance with a recognition result by the recognition means.

16. A card type electronic device system according to claim 1; wherein the card type electronic device is a memory card including means for switching a plurality of memory access speeds; and wherein the selected predetermined operation conditions correspond to one of the memory access speed selected by the control means in accordance with a recognition result by the recognition means.

17. A card type electronic device system according to claim 1; wherein the card type electronic device further comprises a processing circuit that operates in response to an input clock, and means for switching a plurality of input clock speeds; and wherein the selected predetermined operation conditions correspond to one of the input clock speeds selected by the control means in accordance with a recognition result by the recognition means.

18. A card type electronic device system according to claim 1; wherein card type electronic device is an electronic camera card including means for switching a plurality of image resolutions; and wherein the selected predetermined operation conditions correspond to one of the image resolutions selected by the control means in accordance with a recognition result by the recognition means.

19. A card type electronic device comprising:
a connector configured to selectively connect the card type electronic device to a host device via both a first configuration in which the card type electronic device is connected directly to a first card slot of the host device without an adapter and a second configuration in which the card type electronic device is connected to a second card slot of the host device via the adapter, the second card slot having a maximum supply current standard value greater than that of the first card slot, and the card type electronic device starting an operation upon receipt of a current supply from the first card slot or the second card slot of the host device to which it is connected;
recognition means for recognizing the adapter, upon the start of an operation of the card type electronic device, in accordance with a preselected recognition procedure that determines whether the card type electronic device is connected to the first card slot or to the second card slot of the host device; and
control means for selecting predetermined operation conditions which match the maximum supply current standard value of the first card slot when the recognition means recognizes that the card type electronic device is connected to the first card slot, and for selecting predetermined operation conditions which match the maximum supply current standard value of the second card slot when the recognition means recognizes that the card type electronic device is connected to the second card slot.

20. A card type electronic device system according to claim 19; wherein the recognition means transmits a predetermined signal to the adapter and recognizes the adapter in accordance with a response to the transmitted predetermined signal.

21. A card type electronic device according to claim 20; further comprising means for transmitting and receiving radio telephone signals by means of a code division multiple access (CDMA) system; and wherein the selected predetermined operation conditions correspond to a transmission output class of a radio telephone standard of the CDMA system selected by the control means in accordance with a recognition result by the recognition means.

22. A card type electronic device according to claim 19; further comprising means for transmitting and receiving radio telephone signals by means of a code division multiple access (CDMA) system; and wherein the selected predetermined operation conditions correspond to a transmission output class of a radio telephone standard of the CDMA system selected by the control means in accordance with a recognition result by the recognition means.

23. A card type electronic device system for connection to a host device including a first card slot having a first maximum supply current standard value and a second card slot having a second maximum supply current standard value greater than the first maximum supply current standard value, the card type electronic device system comprising:
   a card type electronic device having a connector for direct connection to the first card slot of the host device;
   an adapter comprised of a housing having a first connector provided on a side thereof for connection to the second card slot of the host device, a card retaining space for receiving the card type electronic device, and a second connector provided within the card retaining space for connection to the connector of the card type electronic device when the first connector of the adapter is connected to the second card slot of the host device, the card type electronic device being configured to start an operation upon receipt of a current supply from the first card slot when connected directly thereto or from the second card slot when connected thereto via the adapter;
   identification means compliant with a preselected recognition procedure for identifying the adapter;
   recognition means for recognizing, upon the start of an operation of the card type electronic device and in accordance with the preselected recognition procedure, whether or not the card type electronic device is connected to the second card slot of the host device via the adapter; and
   control means for selecting predetermined operation conditions which match the maximum supply current standard value of the second card slot when the recognition means recognizes that the card type electronic device is connected to the second card slot of the host device via the adapter, and for selecting predetermined operation conditions which match the maximum supply current standard value of the first card slot of the host device when the card electronic device is connected directly to the first card slot and the recognition means recognizes that the card type electronic device is not connected to the second card slot via the adapter.

24. A card type electronic device system according to claim 23; wherein the adapter has the identification means, and the card type electronic device has the recognition means and the control means.

25. A card type electronic device system according to claim 23; wherein the recognition means transmits a predetermined signal to the identification means and the identification means outputs a corresponding predetermined response to the transmitted predetermined signal; and wherein the recognition means recognizes that the card type electronic device is connected to the second card slot of the host device via the adapter in accordance with the predetermined response to the transmitted predetermined signal.

26. A card type electronic device system according to claim 23; wherein the card type electronic device comprises means for transmitting and receiving radio telephone signals by means of a code division multiple access (CDMA) system; and wherein the selected predetermined operation conditions correspond to a transmission output class of a radio telephone standard of the CDMA system selected by the control means in accordance with a recognition result by the recognition means.

27. A card type electronic device system according to claim 23; wherein the card type electronic device comprises means for transmitting and receiving radio telephone signals by means of a time division multiple access (TDMA) system; and wherein the selected predetermined operation conditions correspond to a number of slots for use during a TDMA selected by the control means in accordance with a recognition result by the recognition means.

28. A card type electronic device system according to claim 23; wherein the card type electronic device is a memory card including means for switching a plurality of memory access speeds; and wherein the selected predetermined operation conditions correspond to one of the memory access speed selected by the control means in accordance with a recognition result by the recognition means.

29. A card type electronic device system according to claim 23; wherein the card type electronic device further comprises a processing circuit that operates in response to an input clock, and means for switching a plurality of input clock speeds; and wherein the selected predetermined operation conditions correspond to one of the input clock speeds selected by the control means in accordance with a recognition result by the recognition means.

30. A card type electronic device system according to claim 23; wherein card type electronic device is an electronic camera card including means for switching a plurality of resolutions; and wherein the selected predetermined operation conditions correspond to one of the one of the resolutions selected by the control means in accordance with a recognition result by the recognition means.

* * * * *

UNITED STATES PATENT AND TRADEMARK OFFICE
CERTIFICATE OF CORRECTION

PATENT NO. : 7,660,603 B2
APPLICATION NO. : 10/585750
DATED : February 9, 2010
INVENTOR(S) : Noguchi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 476 days.

Signed and Sealed this

Thirtieth Day of November, 2010

David J. Kappos
*Director of the United States Patent and Trademark Office*